United States Patent [19]
Nelson et al.

[11] Patent Number: 5,973,942
[45] Date of Patent: Oct. 26, 1999

[54] START UP CIRCUIT FOR DC POWERED FIELD INSTRUMENT

[75] Inventors: Richard L. Nelson, Chanhassen; John A. Kielb, Eden Prairie, both of Minn.

[73] Assignee: Rosemount Inc., Eden Prairie, Minn.

[21] Appl. No.: 09/113,942

[22] Filed: Jul. 10, 1998

[51] Int. Cl.[6] .......................... H02H 7/10; H02M 3/335; H02M 3/24

[52] U.S. Cl. ................ 363/21; 363/50; 363/97; 363/131; 323/901; 323/908

[58] Field of Search .................. 363/49, 50, 21, 363/97, 131; 323/908, 901

[56] References Cited

U.S. PATENT DOCUMENTS 5,087,871   2/1992   Losel ........................................ 323/299

OTHER PUBLICATIONS

Ullrich Von Seckendorff and Karen Speers, "Selecting an Inrush Current Limiter", *Electronic Products*, Jan. 1995, pp. 33–25.

"Electronics Letters an International Publication," The Institution of Electrical Engineers, Aug. 29, 1996, vol. 32, No. 18, pp. 1629–1632.

A.S. Koslovski, "Fast Active Inrush Current Limiter for Boost–based Resistor Emulators," Sixteenth International Telecommunications Energy Conference, Intelec '94, Vancouver, B.C., Canada, pp. 649–652, Oct. 30, 1994.

"LM193/LM293/LM393/LM2903 Low Power Low Offset Voltage Dual Comparators," National Semiconductor, pp. 1–12, Jan 1995.

"LT124/Series High Speed Current Mode Pulse Width Modulators,"Linear Technology LT1241 Series, pp. 1–16, 1992.

*Primary Examiner*—Peter S. Wong
*Assistant Examiner*—Bao Q. Vu
*Attorney, Agent, or Firm*—Westman, Champlim & Kelly, P.A.

[57]                ABSTRACT

A direct current (DC) powered process instrument start up circuit includes an energy storage device, a switching regulator circuit, a variable impedance circuit, and a voltage measurement circuit. The energy storage device is coupled between first and second power supply terminals. The switching regulator circuit is coupled to the energy storage device and has a regulated voltage output. The variable impedance circuit is coupled between the energy storage device and the first power supply terminal and has an impedance control input. The voltage measurement circuit has a measurement input coupled to the energy storage device and a measurement output coupled to the impedance control input.

13 Claims, 6 Drawing Sheets

START UP CIRCUIT FOR DC POWERED FIELD INSTRUMENT

BACKGROUND OF THE INVENTION

The present invention relates to field mounted industrial process control instruments and, more specifically, to a start up circuit for DC powered field mounted industrial process control instruments.

Industrial process control instruments are used in industry to monitor and control processes. A field mounted instrument, such as a transmitter, monitors a process variable such as temperature, flow rate, level or pressure. A field mounted instrument is powered by an external power supply which supplies power over a process control loop or over a separate pair of wires which are coupled to the instrument. A voltage regulator converts the instrument's input power to a regulated voltage level that can be used to operate the internal electronics of the instrument. Some field mounted instruments, such as magnetic flow meters and radar level gauges, require relatively high input power to operate, on the order of ten watts. To most efficiently use the available input power, designers of field mounted instruments are increasingly using switching regulators to regulate the voltage level.

A voltage regulator, and especially a switching voltage regulator, may require more current to begin its operation than it does to maintain its operation after the field mounted instrument is powered-up. The current that the field mounted instrument takes to begin operation, or start up, is referred to as inrush current.

Well designed external DC power supplies include current limit or overload circuits which limit the amount of power that they can put out to an instrument. The current limit or overload circuits prevent the power supply from experiencing an overload situation which may cause the power supply to have a component failure and stop working. These current limit or overload circuits may be sensitive enough to trip on high output power requirements that occur for relatively short periods of time, such as on start up of a magnetic flow meter or radar level gauge. Often, a larger power supply is needed to handle the inrush current than would otherwise be required during normal operation, which adversely increases the cost of the power supply.

Improved start up circuits are desired for field mounted instruments to allow the instruments to be used with external DC power supplies having a wide range of current limit or overload protection circuits.

SUMMARY OF THE INVENTION

One aspect of the present invention relates to a direct current (DC) powered process instrument start up circuit. The start up circuit includes an energy storage device, a switching regulator circuit, a variable impedance circuit and a voltage measurement circuit. The energy storage device is coupled between first and second power supply terminals. The switching regulator circuit is coupled to the energy storage device and has a regulated voltage output. The variable impedance circuit is coupled between the energy storage device and the first power supply terminal and has an impedance control input. The voltage measurement circuit has a measurement input coupled to the energy storage device and a measurement output coupled to the impedance control input.

Another aspect of the present invention relates to a method of initiating power to a field mounted process instrument which includes a storage capacitor and a switching regulator. The method includes: applying an input voltage to the field mounted process instrument; charging the storage capacitor with the input voltage through a first current path which has a first impedance; measuring a voltage developed across the storage capacitor; charging the storage capacitor with the input voltage through a second current path, which has a second impedance that is lower than the first impedance, after the voltage developed across the storage capacitor reaches a predetermined level relative to the input voltage; and powering the switching regulator only after the voltage developed across the storage capacitor reaches the predetermined level.

DETAILED DESCRIPTION OF THE PREFERRED EMBODIMENTS

The start up circuit of the present invention can be used with any field instrument, such as a pressure transmitter, temperature transmitter, flow transmitter or level transmitter which has a circuit that converts the instrument's input power to regulated voltage levels for operating the internal electronics of the instrument.

Figure 1:
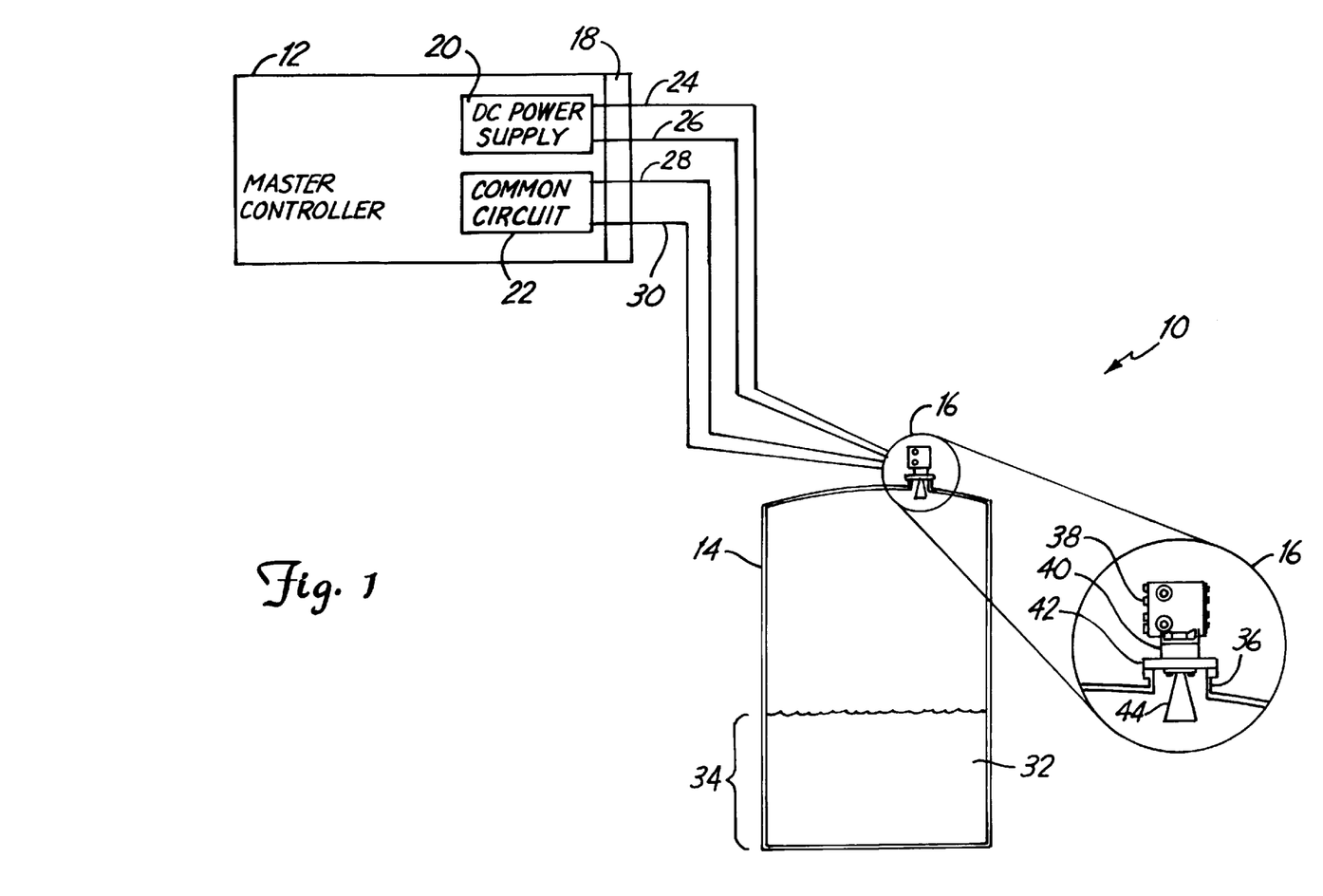
FIG. 1 is a schematic representation of an industrial process control system in which a radar level gauge assembly is installed.

FIG. 1 is a schematic representation of an industrial process control system environment in which a radar level gauge assembly having a start up circuit is installed according to one embodiment of the present invention. System 10 includes master controller 12, process tank 14 and radar level gauge assembly 16. Master controller 12 includes barrier 18, DC power supply 20 and communication circuit 22. Barrier 18 provides intrinsic safety for the elements of master controller 12 from the potentially hazardous environment of process tank 14. DC power supply 20 supplies power to radar level gauge assembly 16 over wires 24 and 26. Communication circuit 22 communicates with radar level gauge assembly 16 over wires 28 and 30, which can form a process control loop such as 4–20 mA process control loop for example.

Process tank 14 is filled with liquid 32, the height or level 34 of which is determined by radar level gauge assembly 16. Radar level gauge assembly 16 is mounted on a tank port 36 at the top of the tank. Radar level gauge assembly 16 includes electronics housing 38, housing-to-flange adapter 40, process connecting flange 42 and antenna 44. Radar level gauge assembly 16 transmits microwave energy downward from antenna 44 toward the surface of liquid 32. A portion of the microwave energy is reflected back by the liquid surface, and is received by antenna 44. Level 34 is then measured within radar level gauge assembly 16 by calculating the time it takes for microwave energy to travel to the liquid surface and back to antenna 44. Radar level gauge assembly 16 then transmits the measured liquid level to communication circuit 22 by controlling the level of current flowing through wires 28 and 30 as a function of the measured liquid level, for example. Alternatively, assembly 16 can transmit the measured liquid level in a digital fashion by modulating the current through wires 28 and 30 according to one of a variety of communication protocols.

Assembly 16 is an example of a four-wire process control instrument in which power is received over a separate pair of wires from the process control loop. The present invention can also be used in a two-wire process control instrument in which all power for operating the instrument is received through the process control loop.

Figure 2:
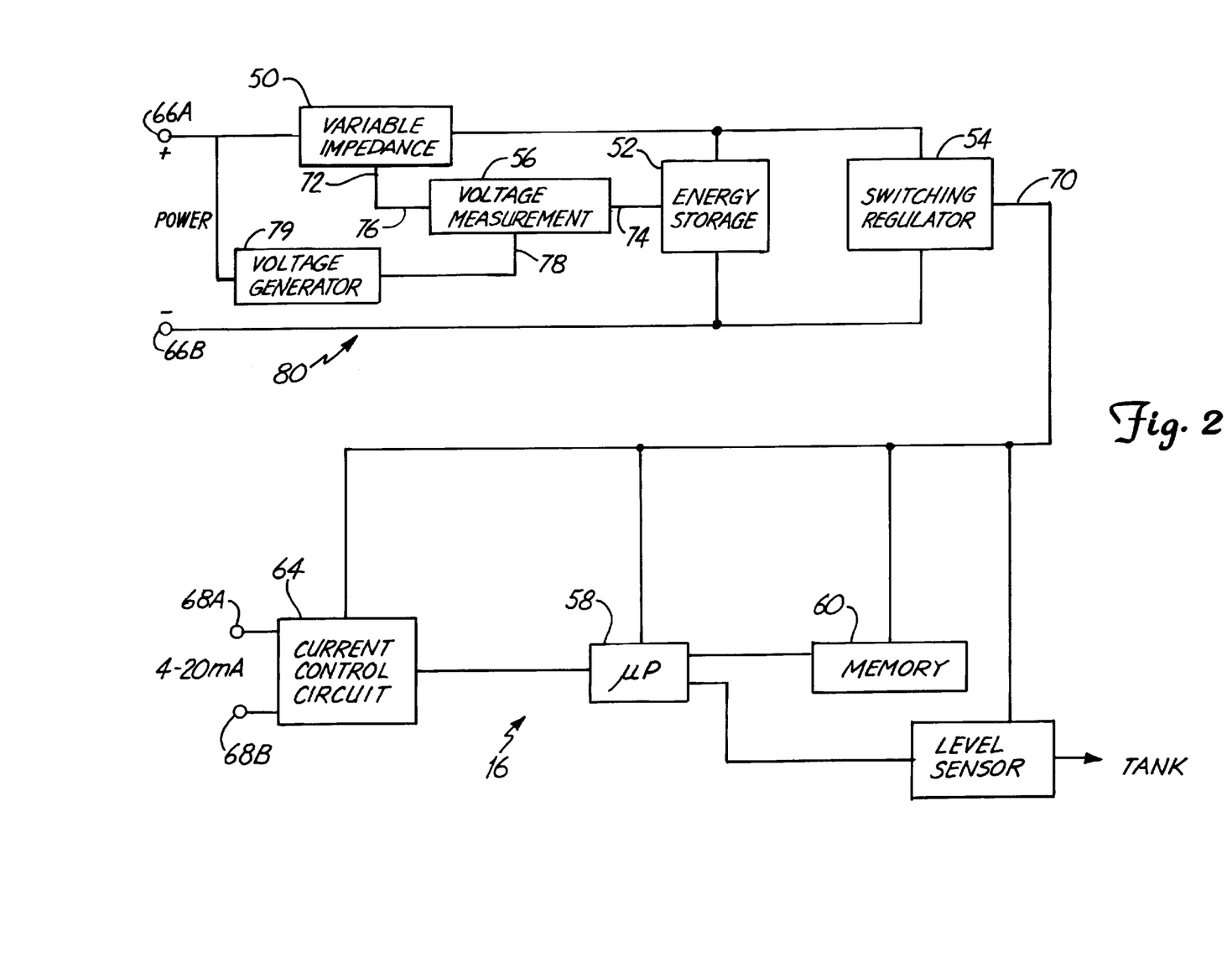
FIG. 2 is a simplified block diagram of the radar level gauge assembly shown in FIG. 1.

FIG. 2 is a simplified block diagram of radar level gauge assembly 16. Assembly 16 includes variable impedance circuit 50, energy storage circuit 52, switching regulator circuit 54, voltage measurement circuit 56, microprocessor 58, memory 60, level sensor 62 and current control circuit 64. Assembly 16 further includes power supply terminals 66A and 66B for coupling to wires 24 and 26 (shown in FIG. 1) and process control loop terminals 68A and 68B for coupling to wires 28 and 30 (also shown in FIG. 1).

Energy storage circuit 52 is coupled between power supply terminals 66A and 66B, through variable impedance circuit 50. Switching regulator circuit 54 is coupled to energy storage circuit 52 and has a regulated voltage output 70. Level sensor 62 is powered by switching regulator circuit 54 through regulated voltage output 70. Level sensor 62 senses level 34 in tank 14 (shown in FIG. 1). Other sensors can be used in alternative embodiments to sense other process variables such as temperature, flow rate or pressure. Microprocessor 58 is coupled to sensor 62 for receiving the sensed level 34 and is powered by switching regulator circuit 54 through regulated voltage output 70. Memory 60 is coupled to microprocessor 58 and is also powered by switching regulator circuit 54 through regulated voltage output 70. Microprocessor 58 calculates liquid level based on the level measurements received from level sensor 62 and instructions and parameters stored in memory 60.

Current control circuit 64 is coupled between microprocessor 58 and loop terminals 68A and 68B for controlling the current flowing through the loop terminals as a function of the sensed liquid level under control of microprocessor 58. For example, current control circuit 64 can control the current level through the process control loop as function of the liquid level or can transmit the calculated liquid level or other status information by modulating the current flowing through loop terminals 68A and 68B according to a selected digital communication protocol. Current control circuit 64 is also powered by switching regulator circuit 54 through regulated voltage output 70.

Variable impedance circuit 50 is coupled between power supply terminal 66A and energy storage circuit 52 and has an impedance control input 72. Variable impedance circuit 50 varies an impedance between power supply terminal 66A and energy storage circuit 52 as a function of an impedance control signal applied to impedance control input 72. Voltage measurement circuit 56 has a voltage measurement input 74 which is coupled to energy storage circuit 52 and a voltage measurement output 76 which is coupled to impedance control input 72. Voltage measurement circuit 56 measures a voltage across energy storage circuit 52 and generates the impedance control signal on output 76 as a function of the measured voltage. Voltage measurement circuit 50 also has a power input 78 which is coupled to power terminal 66A through voltage generator 79 for receiving power from terminal 66A as switching regulator 54 is powering up.

Variable impedance circuit 50, energy storage circuit 52, switching regulator circuit 54 and voltage measurement circuit 56 together form a start up circuit 80 which converts the input power received through terminals 66A and 66B to a regulated voltage level on output 70 that can be used to operate the internal electronics of assembly 16.

Figure 3:
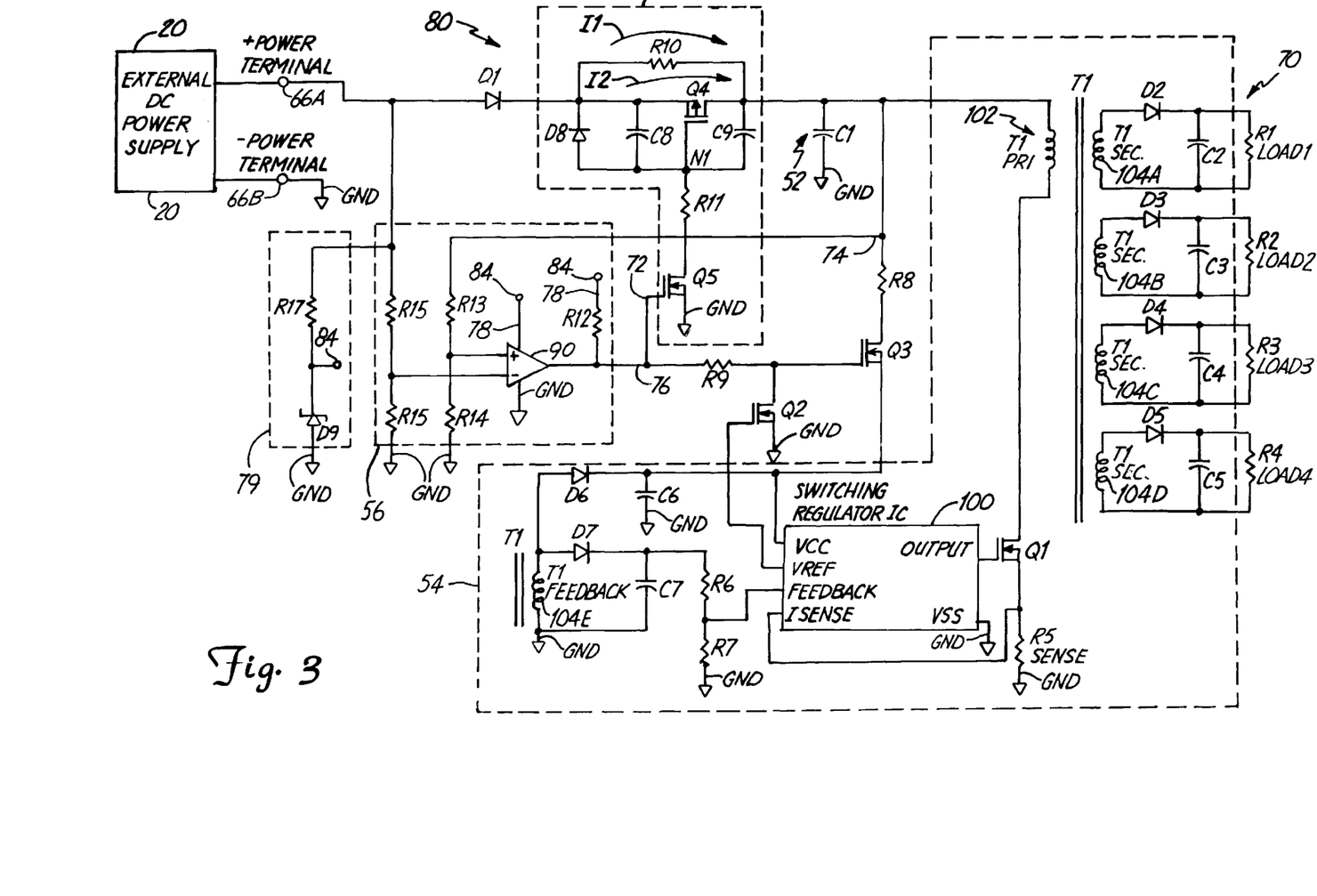
FIG. 3 is a schematic diagram of a start up circuit in the radar level gauge assembly, according to one embodiment of the present invention.

FIG. 3 is a schematic diagram of start up circuit 80 according to one embodiment of the present invention. Start up circuit 80 includes DC power supply terminals 66A and 66B, variable impedance circuit 50, energy storage device 52, switching regulator circuit 54, voltage measurement circuit 56 and voltage generator circuit 79. Power supply terminal 66A is coupled to variable impedance circuit 50 through diode D1, and power supply terminal 66B is coupled to ground terminal GND.

Variable impedance circuit 50 is coupled between diode D1 and energy storage circuit 52 and includes resistors R10 and R11, filter capacitors C8 and C9, Zener diode D8 and transistors Q4 and Q5. Resistor R10 forms a first current path I1 between diode D1 and energy storage circuit 52. Current path I1 has an impedance which is determined by the resistance of resistor R10. Transistor Q4 is a P-channel transistor which forms a second current path I2 which is selectively coupled in parallel with current path I1, between diode D1 and energy storage circuit 52, as a function of a voltage applied by voltage measurement circuit 56 to voltage measurement output 76 which is coupled to impedance control input 72 of variable impedance circuit 50. When transistor Q4 is on, current path I2 has an impedance which is lower than the impedance of current path I1.

Transistor Q5 is a N-channel transistor which is coupled in series with resistor R11, between node N1 and ground terminal GND. The gate of transistor Q5 is coupled to impedance control input 72. Transistor Q5 selectively turns transistor Q4 on and off by pulling the gate of transistor Q4 low or allowing the gate of transistor Q4 to float high as a function of the voltage applied to output 76 of voltage measurement circuit 56.

In the embodiment shown in FIG. 3, energy storage circuit 52 includes capacitor C1 which is coupled between transistor Q4 and ground terminal GND. Energy storage circuit 52 charges through the high impedance of current path I1 or the low impedance of the parallel combination of current paths I1 and I2 based on the voltage applied to impedance control input 72.

Voltage generator circuit 79 includes resistor R17, voltage output terminal 84 and Zener diode D9 which are coupled in series between supply terminal 66A and ground terminal GND. Voltage generator circuit 79 generates a voltage on voltage output terminal 84 which is used to power voltage measurement circuit 56, through input 78.

Voltage measurement circuit 56 includes resistors R12–R16 and comparator 90. The non-inverting input of comparator 90 is coupled to voltage measurement input 74 through a voltage divider formed by resistors R13 and R14. The inverting input of comparator 90 is coupled to power supply terminal 66A through a voltage divider formed by resistors R15 and R16. The output of comparator 90 is coupled to voltage measurement output 76. Comparator 90 has power supply inputs which are coupled to voltage output terminal 84 and ground terminal GND, respectively. Comparator 90 can include an LM193 series low power, low offset voltage comparator available from National Semiconductor Corporation, for example. Other comparator circuits can also be used.

Comparator 90 compares the voltage across energy storage circuit 52 to the voltage across supply terminals 66A and 66B. The voltage on output 76 indicates whether the voltage across energy storage circuit 52 is within a predetermined percentage of the voltage across power supply terminals 66A and 66B. The selected percentage is determined by selecting the resistance ratio of resistors R13 and R14 relative to the resistance ratio of resistors R15 and R16.

At start up, the voltage applied to the non-inverting input of comparator 90 will be less than the voltage applied to the inverting input of comparator 90, causing output 76 to be low. With output 76 low, transistor Q5 is off and allows the gate of transistor Q4 to float high, turning off transistor Q4. With transistor Q4 off, energy storage circuit 52 charges through resistor R10. Since resistor R10 has a relatively high impedance, this limits the inrush current required to charge energy storage circuit 52 and the other components within start up circuit 80. Once energy storage circuit 52 charges to the predetermined level, the voltage applied to the non-inverting input of comparator 90 reaches the voltage applied to the inverting input, and the voltage on output 76 goes high. Transistor Q5 turns on, pulling the gate of transistor Q4 low. Transistor Q4 turns on, effectively shorting resistor R10, between diode D1 and energy storage circuit 52. Thereafter, energy storage circuit 52 charges through the low impedance path formed by transistor Q4.

Switching regulator circuit 54 includes current-mode pulse width modulator 100, transformer T1, switching transistor Q1, current sense resistor R5, voltage divider resistors R6 and R7, capacitors C6 and C7 and diodes D6 and D7. Pulse width modulator 100 can include an LT1241 series current mode pulse width modulator from Linear Technology Corporation for example. Pulse width modulator 100 includes supply terminals VCC and VSS, voltage reference output VREF, voltage feedback input FEEDBACK, current sense input ISENSE and output OUTPUT. Supply terminal VCC is coupled to energy storage circuit 52 through resistor R8 and transistor Q3. Transistor Q3 forms a switch having a gate or switch control input which is coupled to voltage measurement output 76 through resistor R9. At start up, when voltage measurement output 76 is low, transistor Q3 is high. This isolates pulse width modulator 100 from energy storage circuit 52. Once sufficient charge has developed on energy storage circuit 52, output 76 goes high, turning on transistor Q3. Transistor Q3 applies power from energy storage circuit 52 to supply terminal VCC for energizing pulse width modulator 100. Once pulse width modulator 100 has powered up, pulse width modulator 100 varies the duty cycle on OUTPUT depending on a voltage applied to feedback input FEEDBACK. Isolating pulse width modulator 100 through transistor Q3 through the initial stages of start up limits the inrush current drawn by start up circuit 80 through power supply terminals 66A and 66B.

Transformer T1 includes primary winding 102, secondary windings 104A–104D and feedback winding 104E. Primary winding 102 is coupled in series with energy storage circuit 52 and the drain of switching transistor Q1. The energy switched across transformer T1 from primary winding 102 to secondary windings 104A–104D and feedback winding 104E is provided by energy storage circuit 52. The amount of energy switched across transformer T1 is a function of the duty cycle of the drive voltage to the gate of transistor Q1.

Windings 104A–104E are coupled to rectifiers formed by diode D2 and capacitor C2, diode D3 and capacitor C3, diode D4 and capacitor C4, diode D5 and capacitor C5, diode D6 and capacitor C6, and diode D7 and capacitor C7 which rectify and filter the voltage generated on each winding. Resistors R1–R4 represent loads coupled to secondary windings 104A–104D. These loads include various circuit elements of radar level gauge assembly 16, such as level sensor 62 shown in FIG. 1.

Once pulse width modulator 100 is powered up, voltage reference output VREF goes high, turning on pull-down transistor Q2, which turns off transistor Q3. Thereafter, feedback winding 104E supplies the energy for powering pulse width modulator 100 through diode D6 and capacitor C6, which are coupled to supply input VCC. Resistors R6 and R7 form a voltage divider having a voltage output coupled to feedback input FEEDBACK. Pulse width modulator 100 monitors the voltage applied to feedback input FEEDBACK and varies the duty cycle of the drive voltage applied to switching transistor Q1 to regulate the voltage supplied to load resistors R1–R4 through transformer T1. Current sense resistor R5 measures the current pulled through primary winding 102 and applies the measurement as a voltage to current sense input ISENSE. If the voltage gets too high, pulse width modulator 100 turns off the drive voltage applied to switching transistor Q1 to provide a cycle-by-cycle current limiting function.

Variable impedance circuit 50 limits inrush current by providing a high impedance through resistor R10 when start up circuit 80 is first powered on by delaying the start of switching regulator circuit 54 until energy storage circuit 52 has developed a sufficient amount of charge. This charge is measured by voltage measurement circuit 56. Once energy storage circuit 52 has developed sufficient charge, switching regulator circuit 54 turns on, and the impedance of variable impedance circuit 50 becomes very low. This allows variable impedance circuit 50 to consume very little power during normal operation.

Figure 4:
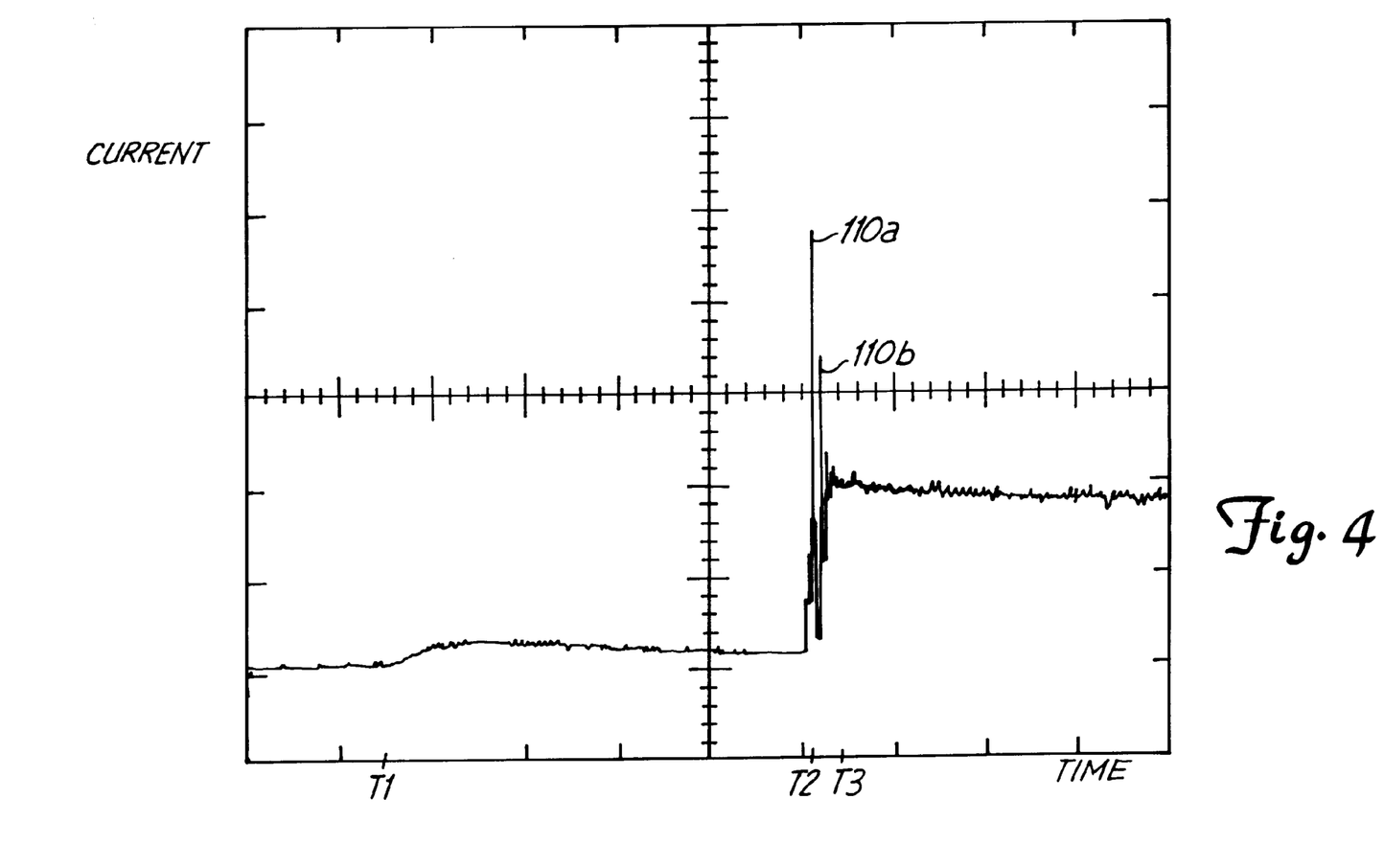
FIG. 4 is plot of the current drawn over time by the start up circuit shown in FIG. 3.

FIG. 4 is a plot of the current drawn from external DC power supply 20 over time by start up circuit 80 shown in FIG. 3, where the vertical, current axis shows 200 mA per division and the horizontal, time axis shows 100 ms per division. Power supply 20 turns on at time T1. From time T1 to time T2, energy storage circuit 52 charges through resistor R10 and initial inrush current is at a very low level. At time T2, energy storage circuit 52 is fully charged and pulse width modulator 100 turns on. The inrush current has two initial switching spikes at 110A and 110B. However, these switching spikes are narrow and do not draw enough energy to trigger the current limit or overload protection circuit in external DC power supply 20. Since energy storage circuit 52 is now fully charged, it is available to assist in providing current to charge secondary capacitances C2–C7. This significantly limits the inrush current drawn from power supply 20. Shortly after time T2, the current drawn from power supply 20 approaches its final operating value. Switching regulator circuit 54 still needs the same total charge to begin its operation, but start up circuit 80 forces it to take longer to acquire this total charge. Thus the start up time for switching regulator circuit 54 is lengthened as a trade-off for lower inrush current. Start up circuit 80 therefore allows a field mounted process control instrument, such as a radar level gauge, to work with external DC power supplies having a wide range of over load protection circuits. The start up circuit also allows the use of smaller and cheaper power supplies since the inrush current that the power supply is required to handle is much lower.

Figure 5:
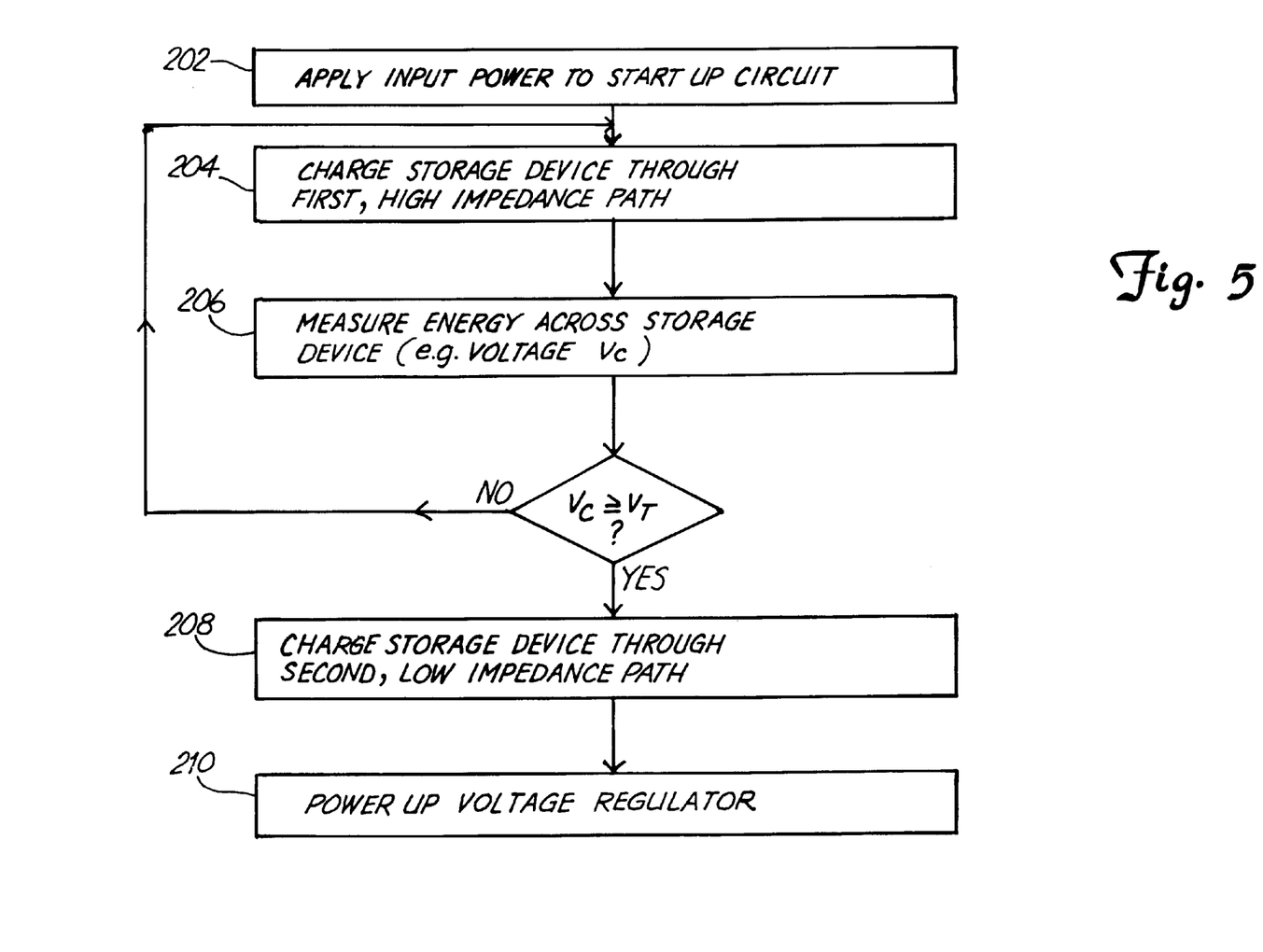
FIG. 5 is a flow chart of a start up sequence for a field mounted process instrument, according to one embodiment of the present invention.

FIG. 5 is a flow chart of a start up sequence for a field mounted process instrument which includes a start up circuit, an energy storage device and a voltage regulator according to the present invention. At point 202, the external DC power supply is turned on and applies an input power to the start up circuit. At point 204, the start up circuit charges the energy storage device with the input power through a first, high impedance. At point 206, the start up circuit measures the energy, such as a voltage $V_C$, developed across the storage device. When the energy developed across the storage device reaches a predetermined level, such as a voltage $V_T$, relative to the input voltage, at point 208, the start up circuit charges the storage device with the input power through a second impedance that is lower than the first impedance. At point 210, the start up circuit powers the voltage regulator after the voltage developed across the storage device reaches the predetermined level $V_T$.

Figure 6:
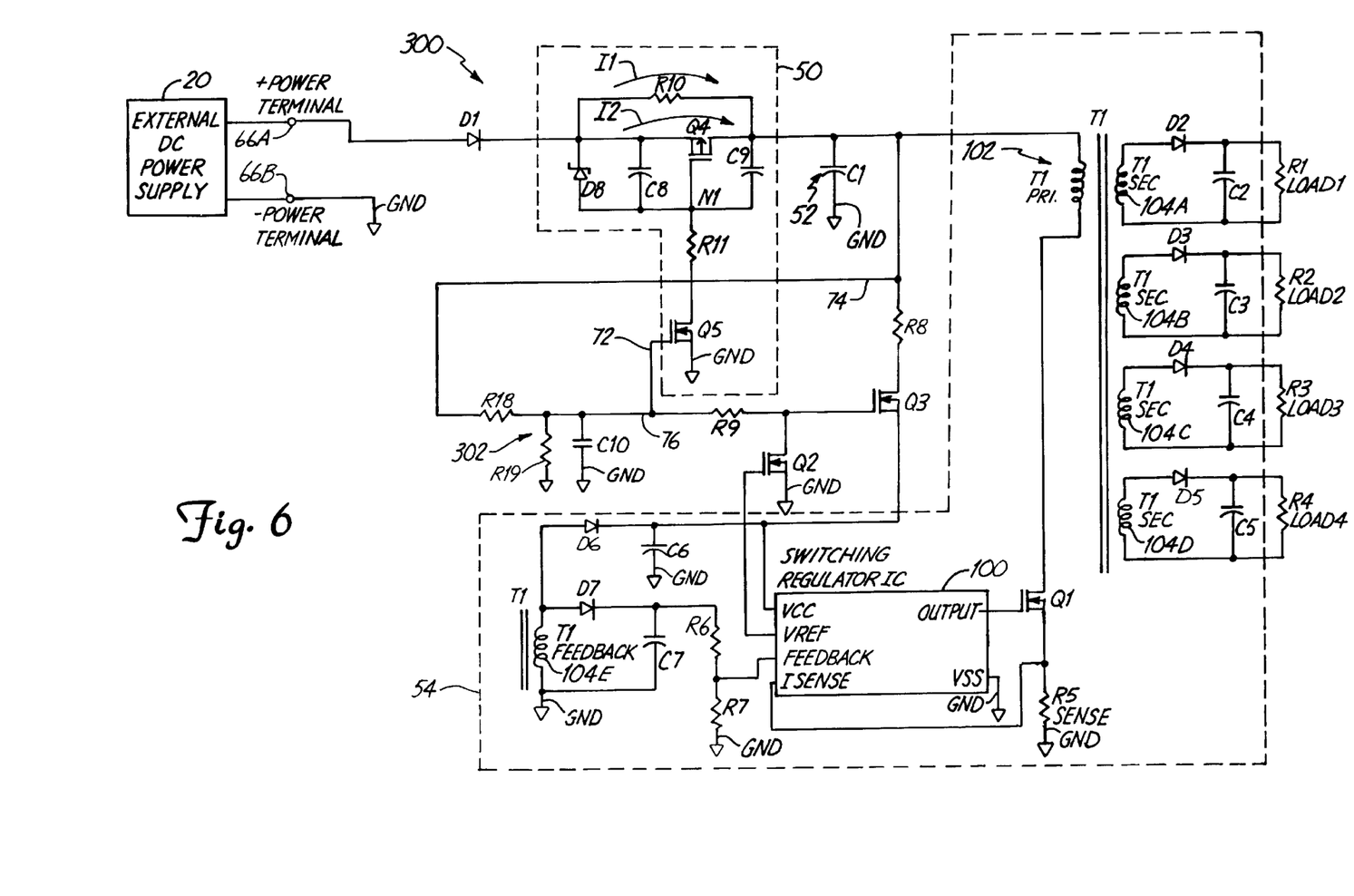
FIG. 6 is a schematic diagram of a start up circuit having an alternative voltage measurement circuit, according to an embodiment of the present invention.

FIG. 6 is a schematic diagram of a start up circuit 300 having an alternative voltage measurement circuit. The same reference numerals are used in FIG. 6 as were used in the previous Figures for the same or similar elements. In FIG. 6, voltage measurement circuit 302 includes a resistor-capacitor (RC) circuit formed by resistors R18 and R19 and capacitor C10 and coupled between voltage measurement input 74 and voltage measurement output 76. Resistors R18 and R19 form a voltage divider. In the embodiment shown in FIG. 6, the voltage on input 74 can range from 18–36 Vdc. To limit the voltage applied to the gate of transistor Q5, resistors R18 and R19 have a resistance ratio of about 3:1 or slightly higher. The RC circuit formed by resistor R18 and capacitor C10 delays the turn-on of transistors Q3 and Q5 until enough charge is stored on energy storage circuit 52 to charge secondary capacitances C2–C7. Other voltage measurement circuits can also be used.

Although the present invention has been described with reference to preferred embodiments, workers skilled in the art will recognize that changes may be made in form and detail without departing from he spirit and scope of the invention. For example, the variable impedance circuit can have various configurations and can include various types resistive devices. Also, the power supply terminals can be relatively positive or relatively negative, depending upon the particular convention adopted and the technology used. The term "coupled" can include various types of connections or couplings and can include a direct connection or a connection through one or more intermediate components.

What is claimed is:

1. An industrial process control transmitter comprising:

first and second power supply terminals;

first and second process control loop terminals;

an energy storage device coupled between the first and second power supply terminals;

a switching regulator circuit coupled to the energy storage device and comprising a regulated voltage output;

a sensor which is powered by the switching regulator circuit through the regulated voltage output for sensing a process variable;

a microprocessor coupled to the sensor for receiving the sensed process variable, wherein the microprocessor is powered by the switching regulator circuit through the regulated voltage output;

a memory which is coupled to the microprocessor and powered by the switching regulator circuit through the regulated voltage output;

a current control circuit coupled between the microprocessor and the first and second process control loop terminals for controlling a current through the first and second process control loop terminals under control of the microprocessor;

a variable impedance circuit coupled between the energy storage device and the first power supply terminal and having an impedance control input, a first current path with a first impedance and a second current path with a second impedance, wherein the second impedance is less than the first impedance and the second current path is selectively coupled in parallel with the first current path as a function of a voltage applied to the impedance control input; and a voltage measurement circuit comprising a comparator having a first comparison input which is coupled to the energy storage device, a second comparison input which is coupled to the first power supply terminal, and a comparison output which is coupled to the impedance control input.

2. The industrial process control transmitter of claim 1 wherein the first current path comprises a series-connected resistor and the second current path comprises a transistor coupled in parallel with the series-connected resistor and having a current control terminal which forms the impedance control input.

3. The industrial process control transmitter of claim 1 wherein the energy storage device comprises a capacitor.

4. The industrial process control transmitter of claim 1 and further comprising:

a voltage generator coupled between the first and second power supply terminals and generating a voltage output; and wherein the comparator has a power supply input which is coupled to receive the voltage output.

5. The industrial process control transmitter of claim 1 wherein:

the switching regulator circuit further comprises a power supply input;

the transmitter further comprises a switch coupled between the energy storage device and the power supply input of the switching regulator circuit; and the switch comprises a switch control input which is coupled to the comparison output.

6. A direct current (DC) powered process instrument start up circuit comprising:

first and second power supply terminals;

an energy storage device coupled between the first and second power supply terminals;

a switching regulator circuit coupled to the energy storage device and comprising a regulated voltage output;

a variable impedance circuit coupled between the energy storage device and the first power supply terminal and having an impedance control input, a first current path with a first impedance and a second current path with a second impedance, wherein the second impedance is less than the first impedance and the second current path is selectively coupled in parallel with the first current path as a function of a voltage applied to the impedance control input; and a voltage measurement circuit having a comparator with a first comparison input which is coupled to the energy storage device, a second comparison input which is coupled to the first power supply terminal, and a comparison output which is coupled to the impedance control input.

7. The DC powered process instrument start up circuit of claim 6 wherein the first current path comprises a series-connected resistor and the second current path comprises a transistor coupled in parallel with the resistor and having a current control terminal which forms the impedance control input.

8. The DC powered process instrument start up circuit of claim 6 wherein the energy storage element comprises a filter capacitor.

9. The DC powered process instrument start up circuit of claim 6 and further comprising:
 a voltage generator coupled between the first and second power supply terminals and generating a voltage output; and
 wherein the comparator has a power supply input which is coupled to receive the voltage output.

10. The DC powered process instrument start up circuit of claim 6 wherein:
 the switching regulator circuit further comprises a power supply input; and
 the DC powered process instrument start up circuit further comprises a switch coupled between the energy storage device and the power supply input of the switching regulator circuit, wherein the switch comprises a switch control input which is coupled to the comparison output.

11. A method of initiating power to a field mounted process instrument which includes an energy storage device and a voltage regulator, the method comprising:
 applying an input power to the field mounted process instrument;
 charging the energy storage device with the input power through a first impedance;
 measuring energy developed across the energy storage device and comparing the measured energy to a representation of the input power;
 charging the energy storage device with the input power through a second impedance that is lower than the first impedance, after the energy developed across the energy storage device reaches a predetermined level relative to the representation of the input power; and
 powering the voltage regulator after the energy developed across the energy storage device reaches the predetermined level.

12. The method of claim 11 wherein measuring energy comprises measuring a voltage developed across the energy storage device.

13. An industrial process control transmitter comprising:
 first and second power supply terminals;
 first and second process control loop terminals;
 an energy storage device coupled between the first and second power supply terminals;
 a switching regulator circuit coupled to the energy storage device and comprising a regulated voltage output;
 a sensor which is powered by the switching regulator circuit through the regulated voltage output for sensing a process variable;
 a microprocessor coupled to the sensor for receiving the sensed process variable, wherein the microprocessor is powered by the switching regulator circuit through the regulated voltage output;
 a memory which is coupled to the microprocessor and powered by the switching regulator circuit through the regulated voltage output;
 a current control circuit coupled between the microprocessor and the first and second process control loop terminals;
 means for varying an impedance between the energy storage device and the first power supply terminal as a function of an impedance control signal; and
 means for measuring a voltage across the energy storage device and for generating the impedance control signal as a function of a comparison between the measured voltage and a representation of a voltage on the first power supply terminal.

* * * * *